United States Patent [19]

McNamara

[11] Patent Number: 5,738,047
[45] Date of Patent: Apr. 14, 1998

[54] EQUIDAE MANURE/URINE CATCHER

[75] Inventor: William John McNamara, Kerrie, Australia

[73] Assignee: Equinap Pty Ltd, Melbourne, Australia

[21] Appl. No.: 648,095

[22] PCT Filed: Nov. 17, 1994

[86] PCT No.: PCT/AU94/00709

§ 371 Date: May 20, 1996

§ 102(e) Date: May 20, 1996

[87] PCT Pub. No.: WO95/13695

PCT Pub. Date: May 26, 1995

[30] Foreign Application Priority Data

Nov. 19, 1993 [AU] Australia ................. PM2530
Sep. 29, 1994 [AU] Australia ................. PM8463

[51] Int. Cl.[6] ........................................ A01K 23/00
[52] U.S. Cl. ......................................... 119/869
[58] Field of Search ........................... 119/867, 868, 119/869, 174; 604/385.1, 346, 347, 348, 349, 350, 351, 352, 353

[56] References Cited

U.S. PATENT DOCUMENTS

| 337,181 | 3/1886 | McDonough . |
| 2,310,505 | 2/1943 | Blackburn et al. . |
| 2,472,186 | 6/1949 | Arnold . |
| 2,536,052 | 1/1951 | Gohlke . |
| 2,544,341 | 3/1951 | McGraw . |
| 3,036,553 | 5/1962 | Gandier . |
| 3,270,714 | 9/1966 | Gandier . |
| 3,850,159 | 11/1974 | Langley . |

FOREIGN PATENT DOCUMENTS

| 62930/86 | 4/1987 | Austria . |
| 925362 | 9/1947 | France . |
| 1 061 560 | 7/1959 | Germany . |

*Primary Examiner*—Thomas Price
*Attorney, Agent, or Firm*—Jacobson, Price, Holman & Stern, PLLC

[57] ABSTRACT

A manure and urine collector pouch for, and to be worn by, an entire or gelded/spayed male/female horse or other animal of the equidae family, the pouch providing a forwardly-extending trough (23) for receiving relatively fluent matter, such that the total weight of the system and contents is distributed along a substantial part of the body.

7 Claims, 5 Drawing Sheets

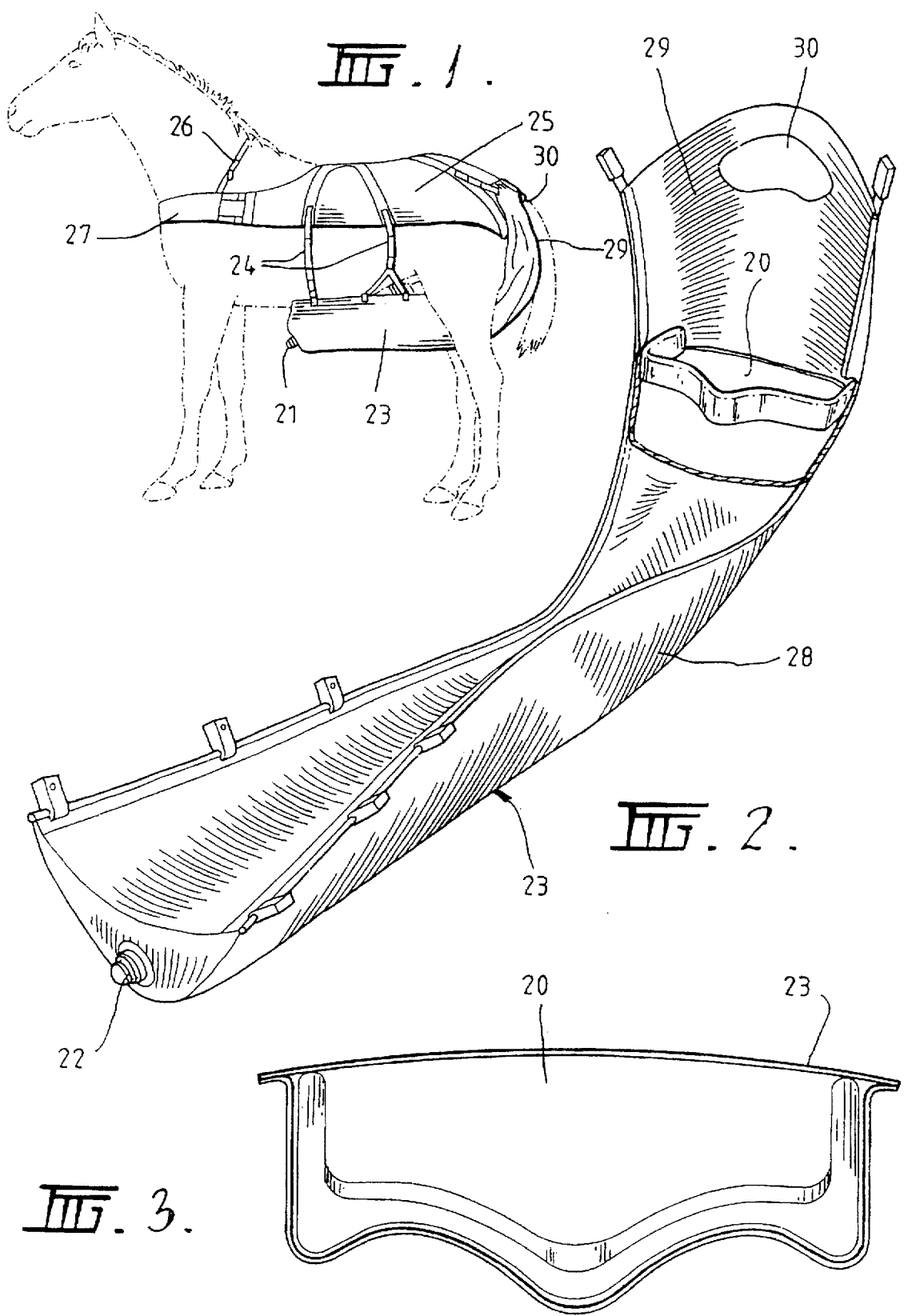

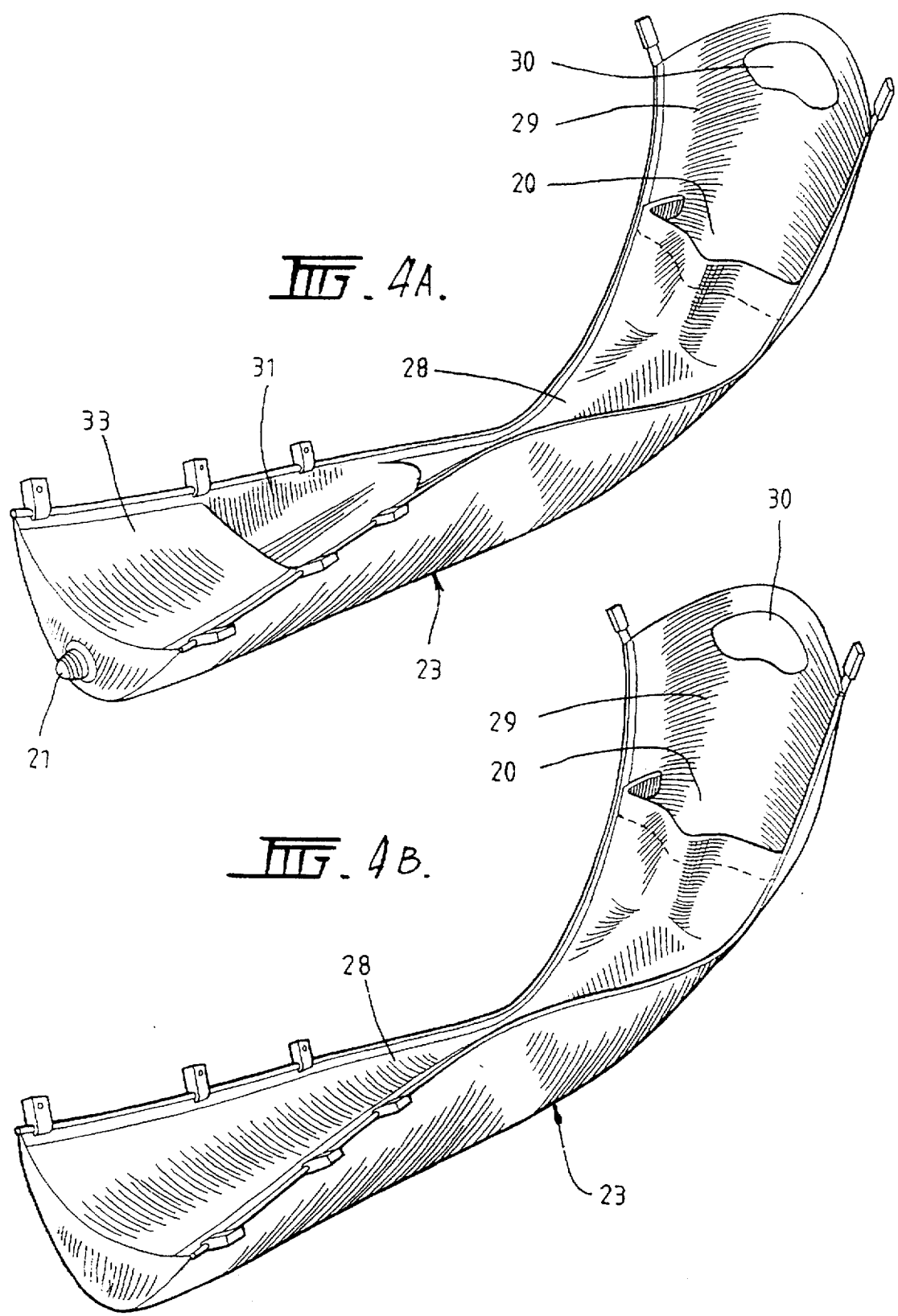

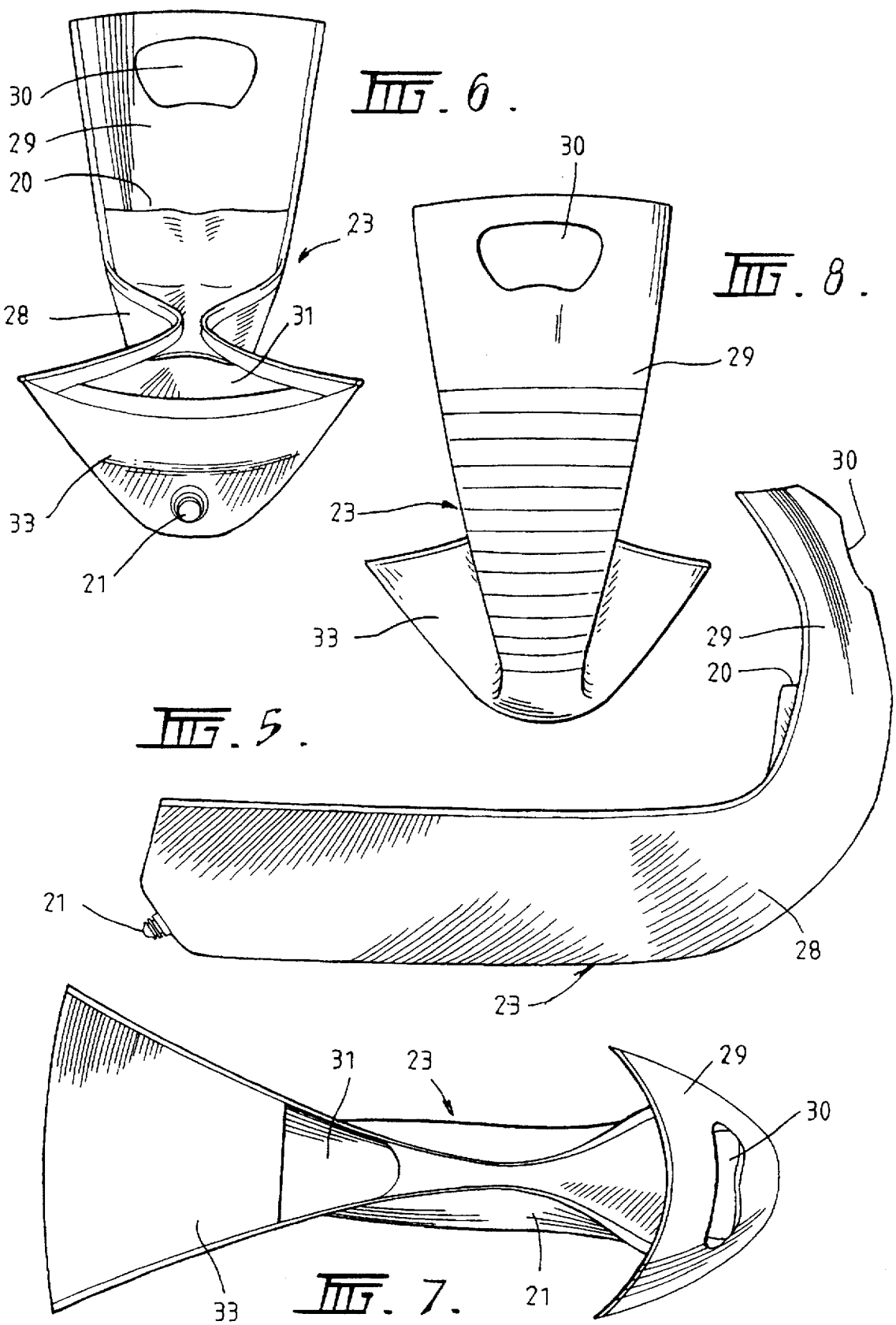

EQUIDAE MANURE/URINE CATCHER

BACKGROUND OF THE INVENTION

This invention relates to the catching and containment of urine and other excrement of horses and other animals including those normally housed in stables or the like, with a view to improving the cleanliness of the stable and the freeing up of labour to other tasks.

Frequent mucking-out of stables, horse-boxes and like shelters and renewal of sawdust etc. have in the past generally been necessary if the animal's accommodation is to be kept in reasonable condition. This can require copious labour of a tedious and unpleasant nature.

It has already been proposed to fit the behind of an entire or gelded male horse with a substantially triangular bag to receive manure defecated by the animal. The bag was supported by a cover draped over the horse's rear with a hole for its tail. A system of chest and neck straps purported to hold the cover and bag in place. A forward end of the bag extended between the horse's rear legs to be detachably secured by straps to the lower sides of the cover, at a position just forward of the rear legs and to the rear of the penis.

A significant disadvantage of such a contrivance is that as the bag is filled it tends to drag down the horse's rear in a way that can cause the animal evident discomfort.

An object of the present invention is to catch and hold defecated matter in a way that causes the animal less discomfort than the use of articles known and used hitherto.

Another object is to provide for the catching and holding of urine of both male and female horses.

A further object is to facilitate the taking of urine and other specimens for testing.

Other objects and advantages will become apparent hereinafter.

DESCRIPTION OF THE INVENTION

According to the present invention in one form, an equidae excrement receptacle is provided for or is adaptable to both males (entire and gelded) and females (entire and spayed) and is capable of holding both manure and urine by means of a catcher and holder system substantially conformable to the animal's belly and extendible forwardly from its rear to the rib area. A forward compartment may receive and hold relatively fluent matter for separate disposal.

In another form the invention provides a system for catching equidae excrement that would otherwise foul the floor or the ground in stables, yards, paddocks or the like, and for enabling such matter to be conveniently disposed of as when and where required, including fastening means, a rear catcher bag for relatively solid matter and a forward compartment for receiving and retaining relatively fluent matter, such that the total weight of the system and contents is distributed along a substantial portion of the animal's body.

In another aspect the invention provides an excrement receptacle capable of being worn by an animal of the equidae family, wherein non-return means admit fluent excrement to a forward compartment of said receptacle.

In a further aspect the invention provides a non-return valve for material passed via an opening into a container wherein a flexible sleeve is expandible by passage of the material therethrough, an outer end of the sleeve being peripherally secured in said opening, the sleeve in its expanded condition forming a passage for the material into the container via the sleeve's inner end, but in the event of back pressure tending to extrude matter back through the opening, the sleeve tending to crush and collapse and thereby to close the opening.

DESCRIPTION OF PREFERRED EMBODIMENT

But in order that the invention may be better understood reference will now be made to the accompanying drawings which illustrate practical preferred embodiment and are to be considered as part of this specification and read herewith. In the drawings:

FIG. 1 shows a practical embodiment of manure/urine catcher and holder device in accordance with the invention fastened to a horse e.g. a stallion;

FIG. 2 is a perspective view of the device shown in FIG. 1 for a mare, the front wall being partially broken away to disclose a "sleeve valve";

FIG. 3 is a top view of a moulded rubber opening support in the device shown in FIGS. 1 and 2;

FIG. 4A is a perspective view of a male version of the device shown in FIGS. 1, 2 and 3;

FIG. 4B is a perspective view of a female or mare version of the device shown in FIGS. 1 to 4A, and omitting the front emptying plug;

FIG. 5, 6 and 7 are respectively side, front and top elevations of the device shown in FIG. 4A;

FIG. 8 is a rear elevation of both male and female devices shown in the preceding figures;

Figure 9:
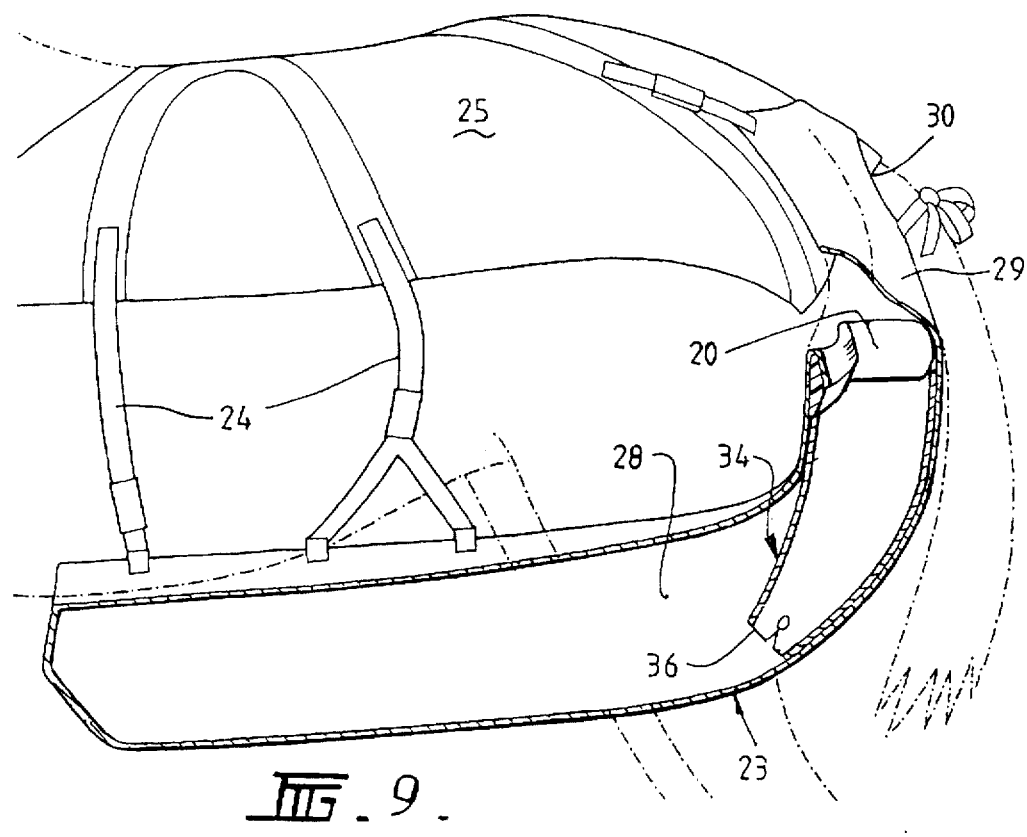
FIGS. 9 and 10 show longitudinal sections of female and male devices as fastened in position to a mare and stallion respectively.
Figure 10:
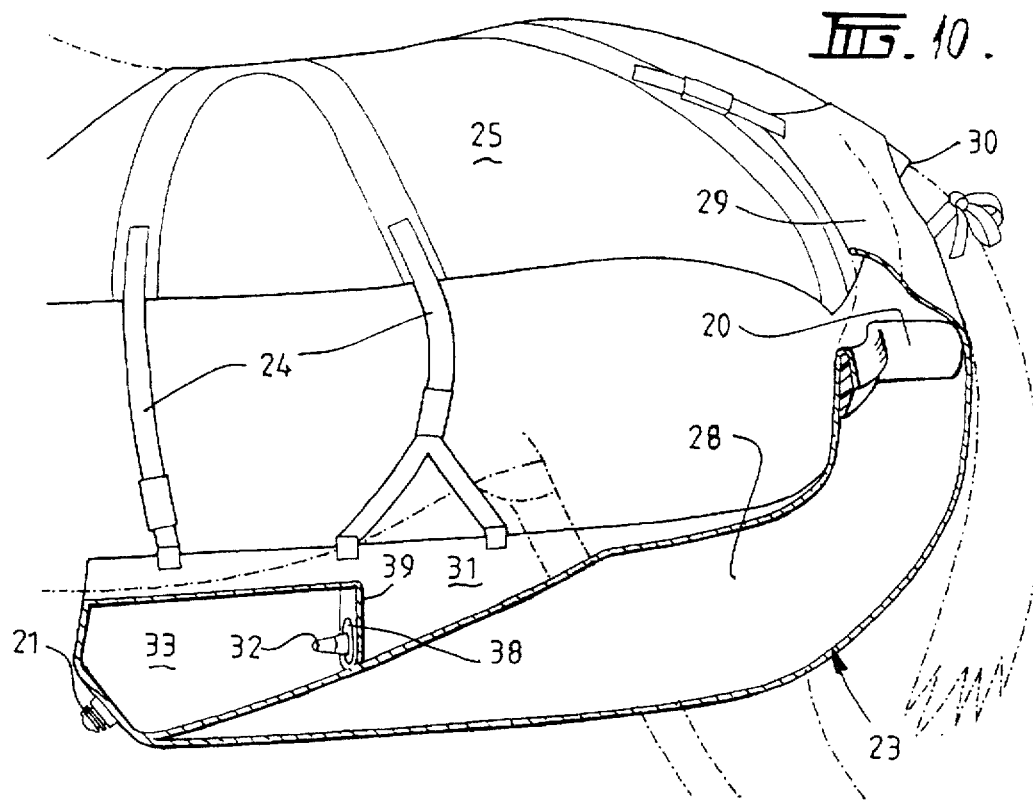
Figure 11:
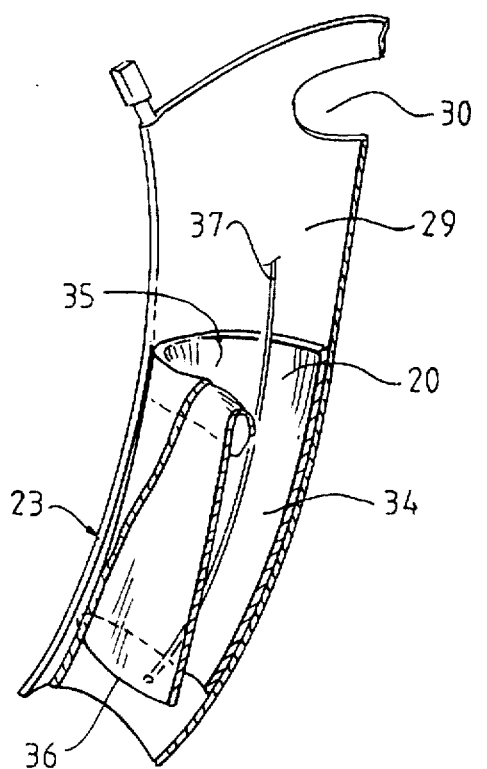
FIG. 11 shows in more detail a back cross section of the female device of FIGS. 2, 4B and 9 including the sleeve valve.
Figure 12:
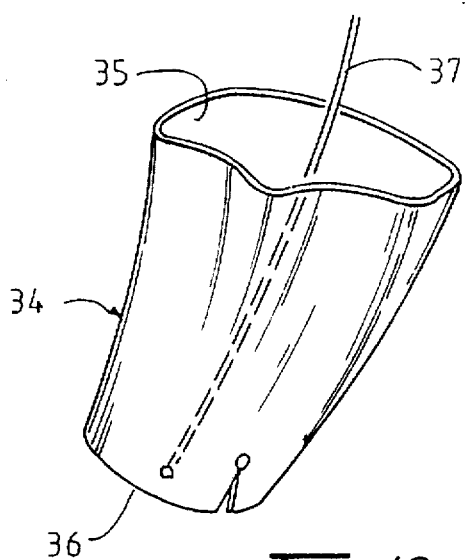
FIG. 12 is a perspective view of the sleeve itself in a normal or extended condition.

Referring to the drawings in more detail, there are shown manure/urine catcher and holder systems adapted for both male and female horses.

As a preliminary general observation in relation to the drawings, it should be stated that the female device is adapted to receive a mixture of solid (manure) and fluid (urine) excrement, and will usually be completely emptied via the device's rear opening 20. Therefore, as in FIGS. 4B and 9, the female device can generally do without the drainage plug 21 shown as part of the male device FIG. 4A, although for some purposes it may be desired to have a drainage plug in a female device, such as shown in 22 in FIG. 2.

As shown generally in FIG. 1, the excrement catcher/holder system for both male and female animals is in the form of a flexible elongated trough-shaped pouch indicated generally by 23 substantially conformable to the animal's belly, extending forwardly from the rear to or towards the rib area.

The device is adapted to catch excrement that would otherwise foul the floor or the ground in stables, yards, paddocks or the like, and enables the excrement to be conveniently disposed of as and where required.

Pouch 23 may be made of any suitably strong, flexible and substantially waterproof material, such as a combination of plastics, hessian and rubber.

The pouch may be fastened to the horse by supporting means, e.g. adjustable straps or harness such as 24 of expandable lightweight or webbing material whereby the animal's freedom of movement will not be restricted unduly. Plastics clamps and/or quick-release clips may be used as required. The supporting means for the device may also include a cover or rug 25 with neck and breast straps 26 and 27 respectively.

The support as a whole is capable of distributing the total weight of the system and contents along a substantial portion of the animal's body e.g. via straps associated with the rump, thigh, back, breast and/or shoulder areas.

Opening 20 affords passage to bag 28 which is the (or a) main part of the system. Extending above opening 20, a rear part 29 of pouch 23 defines an aperture 30 for the animal's tail. Usually the animal will lift its tail somewhat at the onset of a manure (or urination, in the case of a female) cycle. The arrangement of 29 and 30 may assist or allow this tail movement to afford freer/wider passage for excrement into the bag than would normally be permitted by opening 20.

The male version of the device or pouch shown particularly in FIGS. 4A, 6, 7 and 10 has a urine tray or passage 31 with an upper opening positioned below or to receive the animal's penis (not shown) and leading via a non-return valve 32 to receptacle 33 from which urine can conveniently be drained via plug 21.

Also, "zip-fastener", "Velcro" or other openings can be provided, as desired, for quick-emptying of the pouch.

I now refer more particularly to FIGS. 11 to 14. Evidently, in the case of a male animal, the relatively solid excreta (manure) can be kept separate from the fluent excreta (urine). However the female's anatomy presents difficulties in this regard, and the pouch or bag will generally and of necessity contain a semi-fluent mixture of both. To inhibit the tendency of this substance to be forced back out through opening 20, particularly if the horse lies down, there may be fitted within the opening of the bag a flexible funnel-like sleeve 34 of relatively thin plastics or like material of which a wide upper part 35 is secured around the inside of opening 20 of bag 28. Normally, the animal standing, excreta will drop into the bag opening. Its weight will push sleeve 34 into the bag and it defines a convergent channel, through an open lower end 36 of which the excreta passes into the bag itself.

Figure 13:
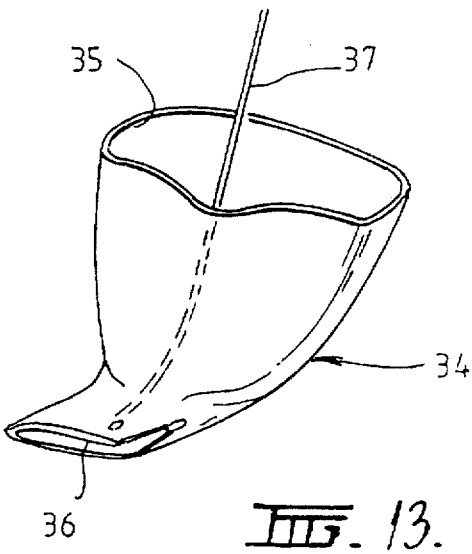
FIG. 13 shows the sleeve partially closed and collapsed.
Figure 14:
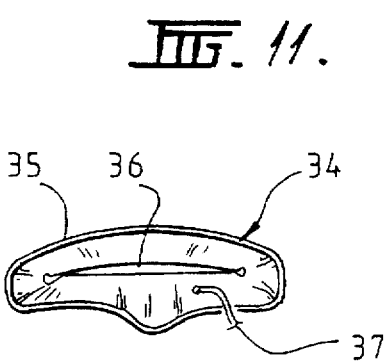
FIG. 14 is a top view of the sleeve as shown in FIG. 12.

If the horse lies down, the resulting compression of pouch 23 may tend to extrude semi-liquid matter back through opening 20. However a sleeve such as 34 can at least to some extent act as a non-return valve for manure/urine retention. Pressure inside the pouch will tend to crush and collapse the sleeve outwardly, and thereby to block the opening. FIG. 13 shows an early stage of this crushing movement, and particularly the closing of end 36, which may be assisted by slitting the inner end part of the sleeve as shown.

Cord 37 attached to the lower end of the sleeve may assist in pulling it out through opening 20 such as for cleaning purposes.

Figures 15, 16, 17:
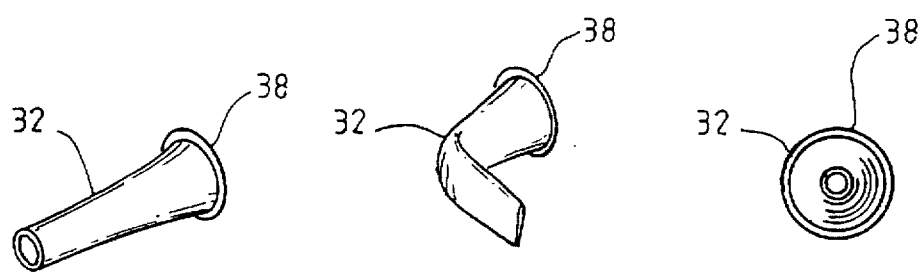
FIG. 15 is a perspective view of a modified sleeve valve shown in an open or extended condition.
FIG. 16 shows the modified sleeve valve partially closed and collapsed.
FIG. 17 is an end view of the modified valve as shown in FIG. 15.

FIGS. 15, 16 and 17 show a modification of sleeve valve 34 useful as the non-return valve 32. This valve, as stated, admits urine from tray or passage 31 to the front receptacle 33.

A wider "outer" end 38 of the sleeve is peripherally secured in an opening in wall 39 separating 31 and 33. The sleeve expands (FIG. 15) to form a convergent passage for urine or other relatively fluent material from 31 to 33, but is crushed back upon itself by back pressure which would otherwise cause liquid to return to 31, thereby effectively blocking the opening.

To prevent the sleeve from being forced back into 31, the opening may be constricted in any desired manner such as by a grating, or an apertured plate.

Irrespective of the provision of non-return valves such as 32 and/or 34, a filter or other device may be provided in the pouch to preferentially pass relatively fluent material.

It will be clear from the foregoing that the invention provides a simple and versatile catcher/holder for equidae excreta, easily emptied and cleaned as required, and providing a relatively equable weight distribution over the animal's body.

Furthermore the ease whereby the matter can be collected and removed greatly facilitates, for example, the taking of specimens for testing.

Although the invention has been described chiefly by reference to horses, it can evidently be adapted for use with other four-legged animals, such as cattle, asses, mules, llamas and other domesticated or domesticable animals which defecate manure and urine. For the purposes of this specification "equidae" is deemed to include all such animals.

For the purposes of this specification terms such as "forward", "forwardly", "rear", "top", "side", "front", "above", "below", "upper" and the like, are to be understood as referring to the invention in a position condition of use and not, therefore, as necessarily limiting.

I claim:

1. An equidae manure and urine catcher/holder system for both male (entire or gelded) and female (entire or spayed) animals, the system including:

a flexible elongated pouch substantially conformable to the animal's belly and extendible forwardly from the rear to or towards the rib area, and fastening means enabling the animal to carry said pouch, a flexible funnel or sleeve of which a wider end portion is secured around the inside of a rear opening of said pouch, the remainder of the sleeve being extendible into the pouch under the weight of excreted matter failing into said opening to admit such matter to the pouch via a narrow inner end of said sleeve, and in the event of back pressure tending to extrude matter back through the opening, to crush and collapse under said pressure so as effectively to close said opening, and a fluid excrement receptacle and/or container located forwardly of a urine and/or manure bag which is the or a main part of the system and positionable below the animal's tail and substantially between its rear legs, and means for emptying the sytem without unfastening the system or any part thereof.

2. A system as claimed in claim 1, wherein the fastening means include adjustable straps or harness placed so as to support the weight of the system and contents via the rump, thigh, back, breast and/or shoulder areas.

3. A system as claimed in claim 1, wherein the emptying means provide for draining fluent material from the system.

4. A system as claimed in claim 1, characterized by means responsive to movement of the animal's tail to assist or allow free passage of excrement into the pouch at the onset of a manure cycle, and allowing said passage to close or to restrict upon completion of said cycle.

5. A system for catching equidae excrement that would otherwise foul the floor or the ground in stables, yards, paddocks or the like, and for enabling such matter to be conveniently disposed of as when and where required, including fastening means, a rear catcher bag for relatively solid matter and a forward compartment for receiving and retaining relatively fluent matter, such that the total weight of the system and contents is distributed along a substantial portion of the animal's body.

6. A system as claimed in claim 5, wherein are provided emptying means for draining fluent material from the forward compartment.

7. A system as claimed in claim 5 including non-return flexible funnel or sleeve valve means whereby fluent material can move forwardly into and be retained in the forward compartment.

* * * * *